Dec. 29, 1970     H. J. WESOLOSKI     3,550,991

FLEXIBLE METALLIC STRESS FREE SEALING MEMBER AND ATTACHED ROD

Filed Oct. 21, 1965

Inventor
Henry J. Wesoloski
By Thomas F. Kirby
Attorney

United States Patent Office

3,550,991
Patented Dec. 29, 1970

3,550,991
FLEXIBLE METALLIC STRESS FREE SEALING MEMBER AND ATTACHED ROD
Henry J. Wesoloski, Milton, Mass., assignor to Allis-Chalmers Manufacturing Company, Milwaukee, Wis.
Filed Oct. 21, 1965, Ser. No. 499,420
Int. Cl. F16j 3/00
U.S. Cl. 277—212
1 Claim

ABSTRACT OF THE DISCLOSURE

A flexible metallic stress free sealing member such as a corrugated bellows is fabricated by depositing a layer of metal on a suitable dissolvable mold and a rod to which the bellows is to be attached extends from the mold in such a way that the attachment portion of the bellows is deposited on the rod to provide a stress free joint.

---

This invention relates generally to flexible metallic sealing members such as bellows and to methods for making the same.

Some types of apparatus, such as electric vacuum switches, for example, comprise a vessel having an opening through which a reciprocably movable member, such as a metallic contact operating rod, extends into the vessel. Frequently, a corrugated metallic bellow of generally cylindrical form is used to provide a vacuum-tight seal for the opening while permitting reciprocable movement of the movable member. Heretofore, it was the practice to employ preformed metallic (usually stainless steel or Monel Metal) bellows and to braze one annular end of the bellows in sealed relationship about the circumference of the movable member. The other annular end of the bellows was suitably secured in sealed relationship about the circumference of the opening in the vessel.

While the aforedescribed process of assembly and the resultant product is suitable for its intended purpose, high caliber brazing technology is required to assure a mechanically strong and vacuum-tight weld between the rod and bellows. Besides the fact that this technique is time consuming and costly, it tends to introduce nonuniform mechanical stresses in the bellows which contribute to mechanical failures during operation.

In accordance with the present invention, it is proposed to fabricate flexible metallic sealing members such as bellows by the process of depositing a layer of metal on a suitably shaped body and to do so in such a manner that the portion of the sealing member for attachment to a movable rod is deposited directly onto the rod in order to eliminate the need for subsequent attachment and to insure an absolutely vacuum-tight stress free connection.

It is an object of the invention to provide improved flexible metallic sealing members such as bellows and improved methods for making the same.

Another object is to provide improved bellows which are fabricated by the process of chemical or electro-deposition and which are attached to a movable member during fabrication.

Another object is to provide improved methods for fabricating bellows by electro-deposition.

Other objects and advantages of the invention will hereinafter appear.

The accompanying drawing illustrates a preferred embodiment of the invention along with means employed in the process of manufacture thereof but it is to be understood that the embodiment illustrated, the means for manufacture disclosed and the processes disclosed are susceptible of modifications with respect to details thereof without departing from the scope of the appended claim.

Figure 1:
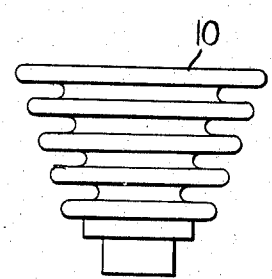
FIG. 1 is a side elevational view of a master die used in the process of making flexible sealing members or bellows in accordance with the present invention.

Referring to FIG. 1 of the drawing, the numeral 10 designates a master die having the shape of a flexible sealing member which is to be fabricated. Die 10 is formed, for example, by precision machining a piece of steel. In the embodiment shown, it is desired that the flexible sealing member or bellows be shaped so as to have a generally tubular corrugated shape and a conical taper.

Figure 2:
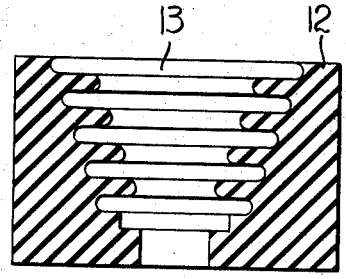
FIG. 2 is a cross sectional view of a flexible female mold used in the process of making bellows in accordance with the present invention.

Die 10 is used to make a flexible mold 12, shown in FIG. 2, which has a cavity 13 therein. Cavity 13 corresponds in shape to die 10. A suitable mold 12 can be made from a product of the Stanley Chemical Company of East Berlin, Conn. called "Stanley 78X330 Plastisol" or a product of the Chemosol Product Corporation of Providence, Rhode Island called "Chem-O-Sol R5256." The material of which mold 12 is made is initially in liquid or castable form and dried to a flexible state retaining the intricate curvatures of die 10 before it is removed from the die. If, instead of a flexible mold, a rigid mold were fabricated, then it would have to be divided in order to be removable from the die 10.

Figure 3:
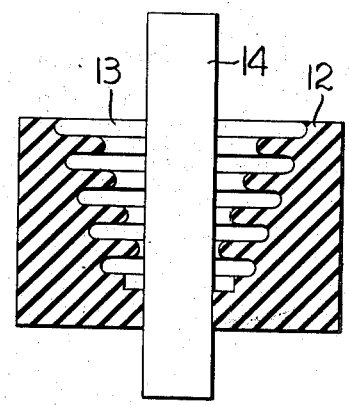
FIG. 3 is a cross sectional view of the female mold of FIG. 2 showing it associated with a metal rod to which a bellows formed in accordance with the present invention is to be attached.

FIG. 3 shows that a metallic rod 14 is inserted in flexible mold 12 through cavity 13 and has end portions extending beyond the top and bottom surfaces of the mold, It is to be understood that rod 14 is cylindrical in shape, that it is preferably made of copper, and that it has been chemically cleaned in readiness for subsequent plating.

Figure 4:
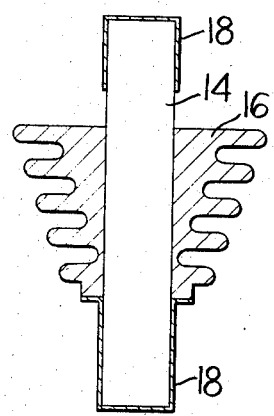
FIG. 4 is a cross sectional view showing the rod attached to a casting made in the mold of FIG. 3 and shows how the rod is masked prior to electro-deposition.

When rod 14 is in place in flexible mold 12, cavity 13 of mold 12 is filled with a liquid material which solidifies to provide a casting 16 or a solid body of electrically conductive material having the shape of master die 10 and adherent to rod 14 after flexible mold 12 is stripped therefrom, as FIG. 4 shows. In practice, casting 16 can be made by pouring a low melting point alloy into cavity 13 in mold 12. An alloy comprising 50% bismuth, 26.7% lead, 13.3% tin and 10% cadmium is a suitable alloy since it adheres to rod 14, is electrically conductive, and has a low melting point of about 158° Fahrenheit. However, other suitable alloys or compounds could be used.

After mold 12 is removed from casting 16, portions of rod 14 are appropriately masked with masking material 18 so that deposits will not form on those portions.

After masking, rod 14 with casting 16 thereon is immersed in a suitable plating solution which is adapted to effect deposition of metal thereon. While a chemical plating process could be employed, it is preferable to employ electroplating techniques in order to better control the plating process. In employing electroplating techniques, the assembly of rod 14 and casting 16 is submerged in a well-known Sulfamate solution or Watts Nickel plating solution and electric current is passed through the solution and through rod 14 and casting 16 to cause a plating to form on the exposed surfaces of the latter members. When a plating of metal of desired thickness is deposited thereon to form the desired flexible sealing member 20 shown in FIG. 5, the current flow is discontinued and the assembly is removed from the plating solution. A thickness of .005 of deposited metal is suitable for some applications.

After member 20 has been formed, the assembly comprising rod 14, member 20 and casting 16 is subjected to treatment which effects removal of the masking material 18 and effects removal of the casting from rod 14 and member 20. Masking material 18 may be physically removed as by peeling or may, if preferred, be removed chemically, depending on its nature. If casting 16 is fabricated of the alloy hereinbefore described, then immersion in boiling water effects melting of the alloy which is then poured out of the cavity 22 within member 20.

Figure 5:
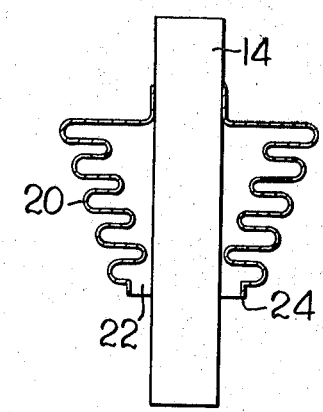
FIG. 5 is a cross sectional view of the rod with bellows formed in accordance with the invention attached thereto.

FIG. 5 shows that sealing member or bellows 20 has a generally tubular corrugated shape with a conical taper and that the sealing member is joined in sealed relationship at one end to rod 14. The assembly comprising bellows 20 and rod 14 is now ready for application to a suitable device, such as a vacuum switch, to which the annular end 24 is adapted to be secured.

It is to be understood that flexible mold 12 may be reused in the fabrication of a large number of bellows which are bonded to rods. Master die 10 can also be reused to fabricate additional molds 12, as needed.

If the application requires it, bellows 20 can be annealed by subjecting it to heat treatment. If bellows 20 is fabricated of nickel, it can be annealed at a temperature of 800° F. (427° C.) for 27 minutes.

The embodiments of the invention in which an exclusive property or privilege is claimed are defined as follows:

1. As an article of manufacture,
a metallic rod, and
a corrugated flexible metallic stress free sealing member of generally tubular shape secured to said rod by a stress free joint, said sealing member surrounding a portion of said rod in coaxial relationship and having a conical taper and a portion adjacent its wider end secured to said rod.

References Cited

UNITED STATES PATENTS

| | | | |
|---|---|---|---|
| 2,627,259 | 2/1953 | Wood et al. | 204—9X |
| 2,793,989 | 5/1957 | Goodman et al. | 204—9 |
| 1,648,046 | 11/1927 | Fulton | 138—121 |
| 2,509,227 | 5/1950 | Gordy | 74—18.2 |
| 2,949,036 | 8/1960 | Ellis | 74—18.2X |
| 3,040,426 | 6/1962 | Hamren | 138—121X |

FOREIGN PATENTS

| | | | |
|---|---|---|---|
| 1,378,901 | 10/1964 | France | 277—212FB |
| 849,367 | 9/1960 | Great Britain | 74—18.2 |
| 473,074 | 7/1952 | Italy | 74—18.2 |

LAVERNE D. GEIGER, Primary Examiner

J. S. MEDNICK, Assistant Examiner

U.S. Cl. X.R.

277—236; 204—9; 29—423